March 11, 1930.  E. O. LOESER  1,749,980
GAUGING INSTRUMENT
Filed Feb. 26, 1925
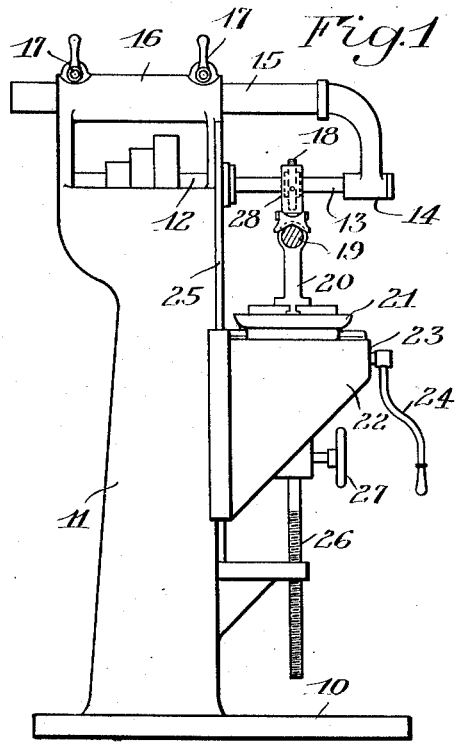
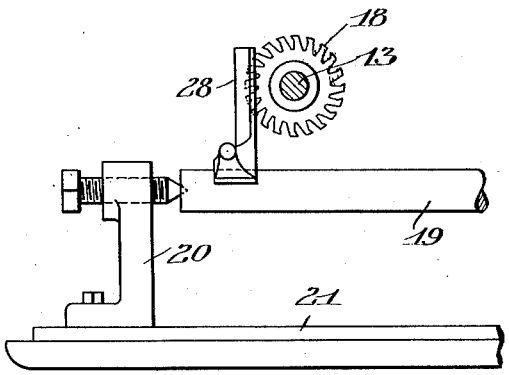
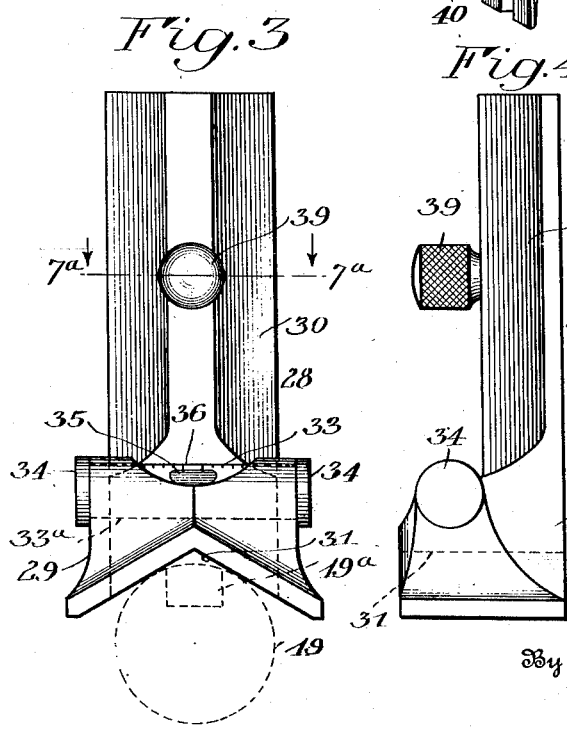
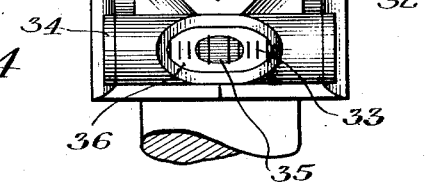
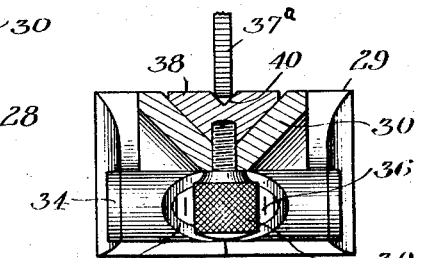
Inventor
Edward Oscar Loeser
By Frederich F. Church
his Attorney Patented Mar. 11, 1930

1,749,980

UNITED STATES PATENT OFFICE

EDWARD OSCAR LOESER, OF ROCHESTER, NEW YORK, ASSIGNOR TO BAUSCH & LOMB OPTICAL COMPANY, OF ROCHESTER, NEW YORK, A CORPORATION OF NEW YORK

GAUGING INSTRUMENT

Application filed February 26, 1925. Serial No. 11,854.

The present invention relates to gauging instruments and has for its object to provide an improved gauge particularly adapted for use as a means to indicate the proper adjustment of a plurality of relatively movable members where it is desired to position said members in a predetermined relation, such, for example, as the relative adjustment of a tool and a work-piece so that the relation of the former with respect to the latter is such as to insure accuracy in the completion of the work.

Another object of the invention is to provide a simple, accurate and economically constructed gauge for indicating the proper position of a plurality of relatively adjustable members adapted to be brought into a predetermined relation with respect to each other.

To these and other ends the invention resides in certain improvements and combinations of parts, all as will be hereinafter more fully described, the novel features being pointed out in the claims at the end of the specification.

In the drawings:—

Figure 1 is a side elevation of a metal working machine showing the manner of employing the gauge to center a milling tool with respect to a work piece;

Figure 2 is a front elevation on an enlarged scale of a portion of the machine shown in Figure 1;

Figure 3 is a front elevational view of one embodiment of the invention;

Figure 4 is a side elevation of the same;

Figure 5 is a fragmentary top plan view showing on an enlarged scale the relative positions of the gauge and milling tool when the latter is centrally disposed with respect to the work piece;

Figure 6 is a perspective view of an adapter arranged for use as a removable part of the gauge to accommodate relatively small cutting tools, and Figure 7 is a sectional plan taken on the line 7ª—7ª of Figure 3 showing the application of the adapter.

Similar reference numerals throughout the several views indicate the same parts.

The metal working machine disclosed in Figure 1, which is shown by way of example to illustrate the use of the invention, embodies a base plate 10 carrying a standard 11 having a power driven member 12 thereon. An arbor 13 is slidably mounted in and adapted to be driven by the member 12. The outer end of the arbor is supported by a bearing 14 carried by an arm 15 which is slidably mounted in a bearing 16 adapted to be secured in any desired position by suitable clamping means such as that indicated at 17 in Figure 1.

The arbor 13 carries a metal cutting tool, such as the miller 18, which is adapted to operate upon a work piece, such as the shaft 19 to form, in the present instance, a slot 19ª therein as indicated by the dotted lines in Figure 3. The work piece 19 is supported upon suitable brackets, one of which is indicated at 20, the brackets being adjustable upon a horizontally disposed carriage 21 movable upon a vertical carriage 22, the former being operable to move the work relatively to the revolving cutter through a feed screw 23 and lever 24 in a well known manner.

The carriage 22 is adjusted vertically upon ways 25 on the standard 11 and is actuated by a feed screw 26 which is suitably connected with an operating handle 27 whereby to move the work into engagement with the tool and to regulate the depth of the cut by the latter.

In slotting or producing key-ways in shafts to be used in connection with certain types of machines it is highly important to accurately center the cutter with respect to the axis of the shaft and the present invention is adapted to insure such accuracy in the adjustment of the tool with respect to the work, or vice versa as may be desired. In the present case, while the shaft or work piece 19 may be adjusted vertically and shifted longitudinally it is also movable laterally with respect to the machine. The tool 18 is however mounted for lateral movement to accommodate it for operation in different planes and it is therefore adapted for different classes of work or for operation on a single work piece at different points.

Heretofore it has been difficult to determine whether or not the tool was accurately centered or aligned with respect to the work but with the present invention this can quickly and readily be determined with a marked degree of accuracy.

The gauge employed for this purpose embodies a frame or body indicated generally at 28 and includes a base 29 and an angularly disposed upstanding portion 30 preferably made integral with the base. The base is provided with a recessed portion preferably constituting a groove or channel 31, the converging walls of which form an obtuse angle so that the gauge may be readily used with different size work pieces, its manner of use being clearly indicated in Figure 2. The upstanding portion 30 of the gauge is also provided with a groove or channel as indicated at 32, the sides of which are preferably at a right angle and adapted to engage the cutting tool as indicated in Figure 5. The means for indicating when the tool is accurately centered or directly aligned with the axis of the shaft 19 comprises a spirit level 33 disposed transversely of the groove 31 in a recess 33ᵃ formed in the base 29, the ends of the level being protected by the closures 34 for the recess, the bubble 35 and scale 36 being viewed through an opening 37 centrally disposed with respect to the base. After adjusting the slide 21 to approximately position the work piece in line with the tool the gauge is placed in an upright position upon the work piece with the tool 18 disposed within the groove 32 as indicated in Figure 5. The slide 21 is then adjusted until the bubble 35 becomes centered, as indicated in Figure 3, in which position the tool and the work will be properly aligned. In this way it is comparatively easy to accurately adjust the work to a predetermined position with respect to the tool, the gauge being properly constructed and tested to insure accuracy in the results produced.

After properly centering the work with respect to the tool, which is preferably done with the parts in the position shown in Figure 2, the carriage 22 is moved upwardly to bring the work into engagement with the tool.

In order to provide for the use of the instrument with relatively small cutting or milling tools, such as the one indicated at 37ᵃ in Figure 7, an adapter 38 is employed which is preferably shaped for disposal within the groove 32 of the extension 30, the adapter being removably secured within said groove by a thumb screw 39 as shown in Figure 7. The adapter is provided with a groove 40 of the desired size and shape to accommodate the tool 37ᵃ. One or more adapters may be employed, the same being constructed so as to be suitable for the particular type or form of cutting tool or other member to be adjusted.

The groove or channel 32 is preferably disposed at a right angle to the groove 31 and the sides of each meet in a common plane passing through the center of the spirit level.

While the invention illustrated herein is well adapted for the particular use provided, it will be understood that the construction may be modified within the scope of the claims to accommodate the instrument to different forms of relatively adjustable members of whatever nature desired, where the object is to insure the accurate adjustment of one with respect to another.

I claim as my invention:

1. A gauging instrument for relatively movable parts comprising a frame having angularly disposed portions for engagement with one of said parts, a member adapted to be secured upon the frame and having angularly disposed portions adapted to engage another of said parts, said last named angularly disposed portions extending in a direction substantially perpendicular to the axis of said first named angularly disposed portions, means for securing said member upon said frame and a spirit level carried by said frame and adapted to indicate when said parts are in a predetermined relationship.

2. A gauging instrument for indicating the proper adjustment between a tool and the work, comprising a base member having angularly disposed portions between which the work may be received, an upstanding member upon the base member having angularly disposed plane surfaces between which the tool may be engaged and means upon said instrument for indicating when the tool has been properly positioned relatively to the work.

3. A gauging instrument for indicating the proper adjustment between a tool and the work, comprising a base member having angularly disposed portions between which the work may be received, an upstanding member upon the base member having angularly disposed plane surfaces between which the tool may be engaged and a spirit level supported on said base member for indicating when the tool has been properly positioned relatively to the work.

4. A gauging instrument for relatively movable parts comprising walls forming a substantially V-shaped groove, walls forming a second substantially V-shaped groove having its axis intersecting and perpendicular to the axis of said first groove, and a spirit level having its axis perpendicular to the plane defined by the intersecting axes of said grooves.

5. A gauging instrument for relatively movable parts comprising walls forming a substantially V-shaped groove, walls forming a second groove having its axis in a plane bisecting the angle of said first groove, and a spirit level having its axis perpendicular to said bisecting plane.

EDWARD OSCAR LOESER.